US011941941B2

(12) United States Patent
Thacker et al.

(10) Patent No.: US 11,941,941 B2
(45) **Date of Patent: *Mar. 26, 2024**

(54) GAMING SYSTEMS AND METHODS FOR USE IN PROVIDING RANDOM REWARDS

(71) Applicant: Video Gaming Technologies, Inc., Franklin, TN (US)

(72) Inventors: Christopher John Thacker, Earlysville, VA (US); Daniel William Milligan, Palmyra, VA (US)

(73) Assignee: VIDEO GAMING TECHNOLOGIES, INC., Franklin, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/154,435

(22) Filed: Jan. 13, 2023

(65) Prior Publication Data

US 2023/0169822 A1 Jun. 1, 2023

Related U.S. Application Data

(63) Continuation of application No. 16/868,282, filed on May 6, 2020, now Pat. No. 11,557,170, which is a continuation of application No. 15/236,883, filed on Aug. 15, 2016, now Pat. No. 10,685,533, which is a continuation of application No. 13/493,709, filed on Jun. 11, 2012, now Pat. No. 9,418,515.

(51) Int. Cl.
*G07F 17/32* (2006.01)

(52) U.S. Cl.
CPC ...... *G07F 17/3218* (2013.01); *G07F 17/3206* (2013.01); *G07F 17/3209* (2013.01); *G07F 17/3211* (2013.01); *G07F 17/323* (2013.01); *G07F 17/3244* (2013.01); *G07F 17/3246* (2013.01); *G07F 17/3251* (2013.01); *G07F 17/3258* (2013.01); *G07F 17/3262* (2013.01)

(58) Field of Classification Search
None
See application file for complete search history.

(56) References Cited

U.S. PATENT DOCUMENTS

| | | | |
|---|---|---|---|
| 6,217,448 | B1 | 4/2001 | Olsen |
| 6,609,975 | B1 | 8/2003 | Sawyer |
| 6,656,048 | B2 | 12/2003 | Olsen |

(Continued)

OTHER PUBLICATIONS

Office Action dated Jul. 9, 2021 for U.S. Appl. No. 16/868,282 (pp. 1-11).

(Continued)

*Primary Examiner* — Jason T Yen
(74) *Attorney, Agent, or Firm* — Armstrong Teasdale LLP

(57) ABSTRACT

Systems and methods for use in providing a random reward associated with at least one game are disclosed. One exemplary method includes receiving, by a gaming server, data representative of gaming activity of a player of the at least one game, providing, by the gaming server, a code associated with the random reward, wherein the code is representative of an entry to win the random reward, receiving, by the gaming server, data representative of a text message including the code, determining whether the player won the random reward based on the received code, and providing a notification indicating whether the player won the random reward.

20 Claims, 3 Drawing Sheets

(56) References Cited

U.S. PATENT DOCUMENTS

| | | | |
|---|---|---|---|
| 7,753,782 B2 | 7/2010 | Cuddy | |
| 2002/0198799 A1 | 12/2002 | Burden | |
| 2003/0162580 A1 | 8/2003 | Cousineau | |
| 2004/0072618 A1 | 4/2004 | Bartholomew | |
| 2004/0162144 A1 | 8/2004 | Loose | |
| 2004/0259626 A1* | 12/2004 | Akram | G07F 17/32 463/17 |
| 2006/0009284 A1 | 1/2006 | Schwartz | |
| 2006/0009285 A1 | 1/2006 | Pryzby | |
| 2006/0025222 A1* | 2/2006 | Sekine | G07F 17/32 463/42 |
| 2006/0046834 A1* | 3/2006 | Sekine | G07F 17/3223 463/20 |
| 2006/0105830 A1 | 5/2006 | Nemitz | |
| 2006/0252501 A1* | 11/2006 | Little | G07F 17/3239 463/25 |
| 2007/0243928 A1 | 10/2007 | Iddings | |
| 2007/0243934 A1* | 10/2007 | Little | G07F 17/3225 463/40 |
| 2007/0275777 A1 | 11/2007 | Walker | |
| 2008/0076571 A1 | 3/2008 | Frerking | |
| 2008/0108424 A1* | 5/2008 | Baerlocher | G07F 17/34 463/25 |
| 2008/0167060 A1 | 7/2008 | Moshir | |
| 2008/0221986 A1 | 9/2008 | Soicher | |
| 2008/0274802 A1 | 11/2008 | Joao | |
| 2009/0042633 A1 | 2/2009 | Yacenda | |
| 2009/0093290 A1 | 4/2009 | Lutnick | |
| 2009/0191962 A1 | 7/2009 | Hardy | |
| 2009/0258691 A1* | 10/2009 | Jagannatha | G07F 17/3218 463/17 |
| 2010/0069136 A1 | 3/2010 | Safaei | |
| 2010/0120525 A1 | 5/2010 | Baerlocher | |
| 2010/0228603 A1 | 9/2010 | Bolder | |
| 2011/0070945 A1 | 3/2011 | Walker | |
| 2011/0250955 A1 | 10/2011 | Adiraju | |
| 2011/0264494 A1 | 10/2011 | Lechowicz | |
| 2012/0157191 A1 | 6/2012 | Burke | |
| 2012/0165088 A1 | 6/2012 | Martinez-Ortega | |
| 2012/0244926 A1 | 9/2012 | Kolios | |
| 2012/0265598 A1 | 10/2012 | Krone | |
| 2012/0276976 A1 | 11/2012 | Yoo | |

OTHER PUBLICATIONS

Office Action (Final Rejection) dated Jan. 27, 2022 for U.S. Appl. No. 16/868,282 (pp. 1-12).

Office Action (Notice of Allowance and Fees Due (PTOL-85)) dated Oct. 13, 2022 for U.S. Appl. No. 16/868,282 (pp. 1-9).

* cited by examiner

GAMING SYSTEMS AND METHODS FOR USE IN PROVIDING RANDOM REWARDS

CROSS REFERENCE TO RELATED APPLICATIONS

This application is a continuation application of U.S. patent application Ser. No. 16/868,282 filed May 6, 2020, entitled "GAMING SYSTEMS AND METHODS FOR USE IN PROVIDING RANDOM REWARDS," which is a continuation of U.S. patent application Ser. No. 15/236,883 filed Aug. 15, 2016, entitled "GAMING SYSTEMS AND METHODS FOR USE IN PROVIDING RANDOM REWARDS," which is a continuation application of U.S. patent application Ser. No. 13/493,709 filed Jun. 11, 2012, entitled "GAMING SYSTEMS AND METHODS FOR PROVIDING RANDOM REWARDS BASED ON GAMING ACTIVITIES," the contents of each of which are hereby incorporated by reference in their entirety.

BACKGROUND OF THE INVENTION

The embodiments described herein relate generally to gaming systems and methods and more particularly, to providing random rewards associated with games.

At least some known gaming systems provide primary games and secondary games. For example, a secondary game may be triggered by a condition, such as a particular combination of symbols associated with a primary play outcome in the primary game. A number of different secondary games are known. Secondary jackpots are generally utilized by gaming entities to encourage additional play from one or more players within a gaming establishment. An example of a secondary game is a progressive jackpot, which incrementally grows as players continue to bet at slot machines and/or video-poker machines linked to the progressive jackpot. The progressive jackpots are generally known to being geographically limited to the gaming establishment, not guaranteed to payout, and open to any player within the gaming establishment. Another example of a secondary game is a mystery jackpot. Mystery jackpots are often set up by the gaming establishment to enhance the experience of playing gaming machines, such as slot machines and/or video-poker machines, within the gaming establishment.

BRIEF DESCRIPTION OF THE INVENTION

In one aspect, a computer-implemented method for use in providing a random benefit associated with at least one electronic game is provided. The method includes receiving, by a gaming server from a gaming machine, electronic inputs corresponding to gaming activity by a player, wherein the gaming activity is associated with a player tracking account associated with the player, and wherein the player tracking account is stored by the gaming server. The method also includes transmitting, by the gaming server to a portable computing device of the player, a code provided for entry towards a first random benefit and storing, by the gaming server, the code, wherein the code is associated with the player tracking account. The method also includes receiving, by the gaming server from the portable computing device, a signal including data representative of the code and, in response to receiving the signal, determining, by the gaming server, that the player is eligible to receive a second random benefit if the code matches a trigger condition for the second random benefit. The method further includes transmitting, by the gaming server to the portable computing device, a notification regarding the second random benefit in response to determining that the player is eligible to receive the second random benefit.

In another aspect, a gaming server for use in providing a random benefit associated with at least one electronic game is provided. The gaming server includes a computer-readable storage medium comprising computer-executable instructions and a processor coupled to said computer-readable storage medium for executing the computer-executable instructions. When the processor executes the computer-executable instructions, the processer is programmed to receive, from a gaming machine, electronic inputs corresponding to gaming activity by a player, wherein the gaming activity is associated with a player tracking account associated with the player, and wherein the player tracking account is stored by the gaming server. The processor is also programmed to transmit, to a portable computing device of the player, a code provided for entry towards a first random benefit and store the code, wherein the code is associated with the player tracking account. The processor is also programmed to receive, from the portable computing device, a signal including data representative of the code and, in response to receiving the signal, determine that the player is eligible to receive a second random benefit if the code matches a trigger condition for the second random benefit. The processor is further programmed to transmit, to the portable computing device, a notification regarding the second random benefit in response to determining that the player is eligible to receive the second random benefit.

In yet another aspect, a gaming system for use in providing a random benefit associated with at least one electronic game is provided. The gaming system includes a gaming machine configured to present the at least one electronic game to a player and a gaming server coupled to said gaming machine. The gaming server is programmed to receive, from a gaming machine, electronic inputs corresponding to gaming activity by a player, wherein the gaming activity is associated with a player tracking account associated with the player, and wherein the player tracking account is stored by the gaming server. The gaming server is also programmed to transmit, to a portable computing device of the player, a code provided for entry towards a first random benefit and store the code, wherein the code is associated with the player tracking account. The gaming server is also programmed to receive, from the portable computing device, a signal including data representative of the code and, in response to receiving the signal, determine that the player is eligible to receive a second random benefit if the code matches a trigger condition for the second random benefit. The gaming server is further programmed to transmit, to the portable computing device, a notification regarding the second random benefit in response to determining that the player is eligible to receive the second random benefit.

DETAILED DESCRIPTION OF THE INVENTION

Exemplary embodiments of systems and methods for use in providing a random reward are described herein. Such embodiments may enhance entertainment aspects of various games by providing codes based on gaming activity to players of the games. The codes are representative of chances to win random rewards. The codes are transmitted to a gaming server by text message for entry to win a random reward, thereby serving to enhance player access to the random reward entries and increase player satisfaction.

Exemplary technical effects of systems and methods described herein include at least one of: (a) receiving, by a gaming server, data representative of gaming activity of a player of at least one game; (b) providing, by a gaming server, a code associated with a random reward, wherein the code is representative of an entry to win the random reward; (c) receiving, by a gaming server, data representative of a text message including a code; (d) determining whether a player won a random reward based on a received code; and (e) providing a notification indicating whether a player won a random reward.

When introducing elements of aspects of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

Figure 1:
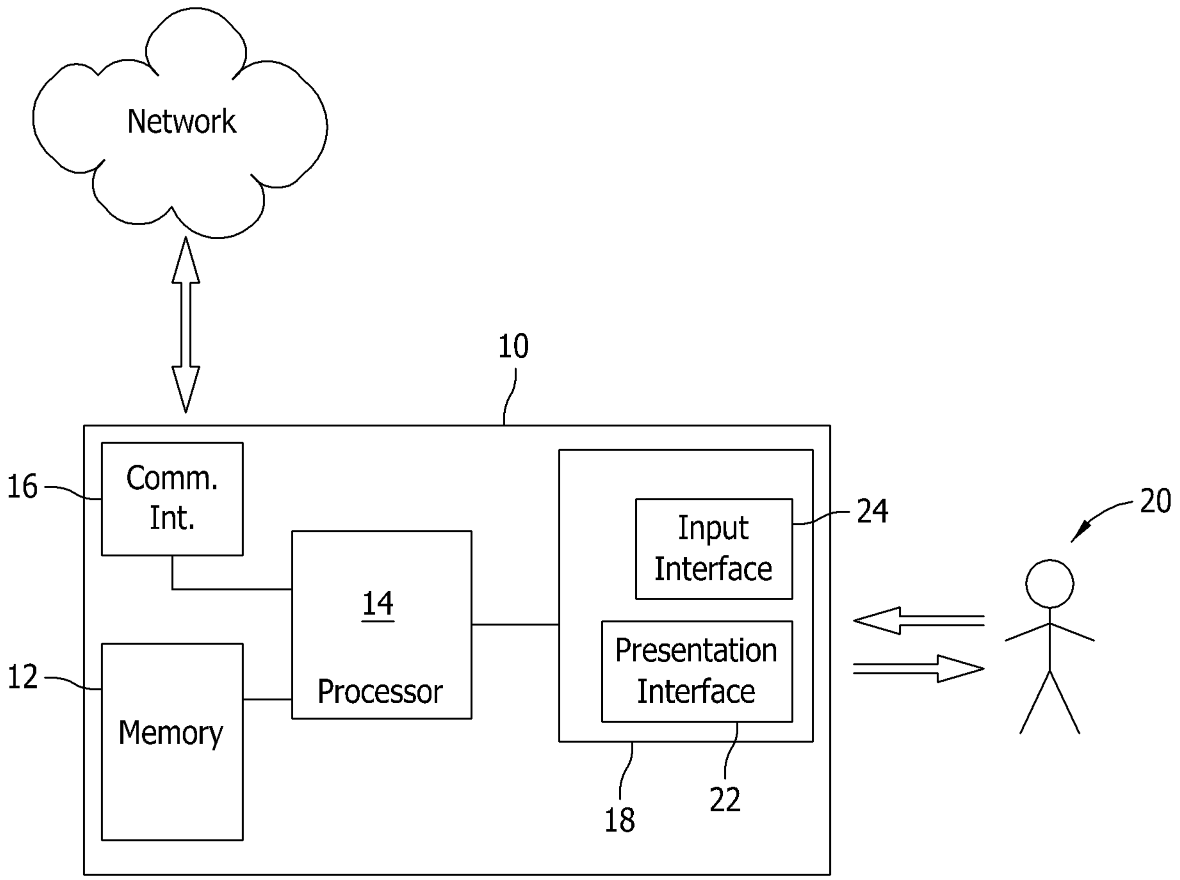
FIG. 1 is a block diagram of an exemplary computing device.

FIG. 1 illustrates an exemplary computing device 10. In the exemplary embodiment, computing device 10 includes a memory 12 and a processor 14 coupled to memory 12. In some embodiments, executable instructions are stored in memory 12 and executed by processor 14. Computing device 10 is configurable to perform one or more operations described herein by programming and/or configuring processor 14. For example, processor 14 may be programmed by encoding an operation as one or more executable instructions and providing the executable instructions in memory 12.

Memory 12 is one or more devices operable to enable information such as executable instructions and/or other data to be stored and/or retrieved. Memory 12 may include one or more computer readable media, such as, without limitation, hard disk storage, optical drive/disk storage, removable disk storage, flash memory, non-volatile memory, ROM, EEPROM, random access memory (RAM), etc. Memory 12 may be configured to store, without limitation, computer-executable instructions, player tracking accounts, credentials, games, and/or any other types of data referred to herein, expressly or inherently. Memory 12 may be incorporated in and/or separate from processor 14.

Processor 14 may include one or more processing units (e.g., in a multi-core configuration). The term processor, as used herein, refers to central processing units, microprocessors, microcontrollers, reduced instruction set circuits (RISC), application specific integrated circuits (ASIC), logic circuits, and any other circuit or processor capable of executing instructions to perform functions described herein.

Computing device 10 includes a communication interface 16 coupled to processor 14. Communication interface 16 is configured to be coupled in communication with a network and/or one or more other devices, such as another computing device 10, a gaming device, a gaming machine, a gaming server, etc. Communication interface 16 may include, without limitation, a serial communication adapter, a wired network adapter, a wireless network adapter, a mobile adapter, a radio frequency (RF) receiver, a Bluetooth adapter, a Wi-Fi adapter, a ZigBee adapter, a near field communication (NFC) adapter, and/or any other device capable of communicating with one or more other devices, networks, etc.

Further, computing device 10 includes an interface 18 to interact with a user 20, such as an operator of a gaming machine. Interface 18 may be configured to display information to a user 20, e.g., a player. In the exemplary embodiment, interface 18 includes a presentation interface 22, such as a cathode ray tube (CRT), a liquid crystal display (LCD), a light-emitting diode (LED) display, an organic LED (OLED) display, an "electronic ink" display, and/or other device suitable to display information. Additionally, or alternatively, interface 18 may include an audio output device (e.g., an audio adapter and/or a speaker, etc.).

Interface 18 further includes an input interface 24 configured to receive one or more inputs. Input interface 24 may include, without limitation, buttons, knobs, keypads, pointing devices, barcodes scanners, mice, cameras, card reader, touch sensitive panel (e.g., a touch pad or a touchscreen), gyroscopes, position detectors, and/or audio inputs (e.g., a microphone). For example, input interface 24 can include a coin acceptor for accepting coins and/or tokens, and a paper acceptor for accepting and/or validating cash bills or tickets from games. Paper acceptor or another input interface 24 may further include a card reader for use with credit cards, debit cards, identification cards, reward cards and/or smart cards. Paper acceptor may further provide a presentation interface 22, suitable for printing coupons. In various embodiments, interface 18 is a single component, such as a touchscreen display, incorporating both presentation interface 22 and input interface 24.

Figure 2:
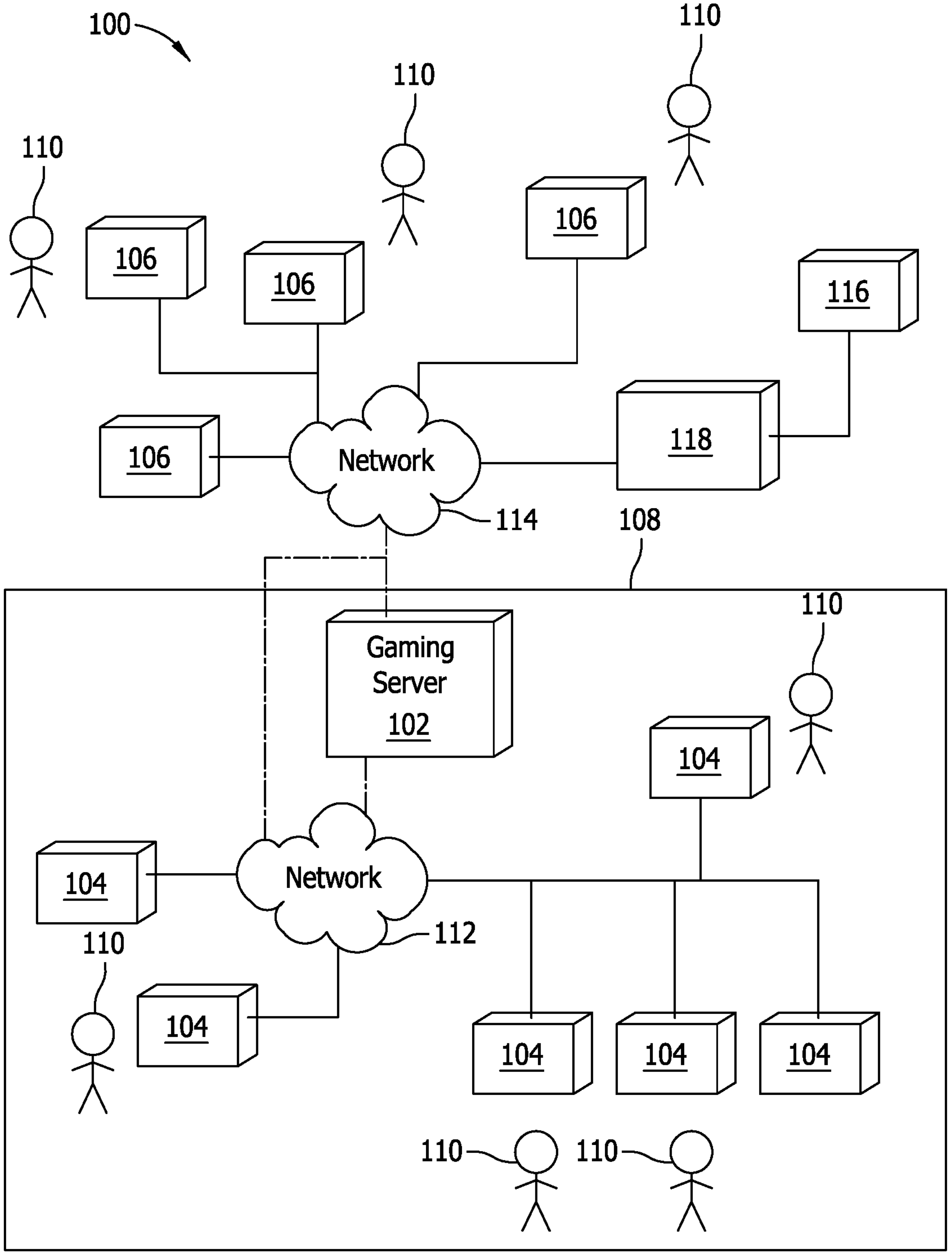
FIG. 2 is a block diagram of an exemplary gaming system that may include multiple of the computing devices of FIG. 1.

FIG. 2 illustrates an exemplary gaming system 100. In the exemplary embodiment, gaming system 100 includes a gaming server 102, a plurality of gaming machines 104 coupled to gaming server 102, and a plurality of gaming devices 106 coupled to gaming server 102. Gaming server 102, gaming machines 104, and gaming devices 106 are examples of computing devices 10. In several examples, gaming machine 104 may include, without limitation, a slot machine, a poker machine, a gaming kiosk, a bingo machine, or other machine potentially employed with respect to one or more gaming activities. As shown in FIG. 2, gaming server 102 and gaming machine 104 are generally associated with (e.g., owned, operated, and/or managed by) a gaming establishment 108 to enable gaming activities by one or more players 110 present within the gaming establishment. Gaming establishment 108 may include, for example, a casino. In various embodiments, gaming server 102 may be physically located inside or outside of gaming establishment 108, yet still associated therewith.

Moreover, in the exemplary embodiment, gaming server 102 is illustrated as a single computing device, located within gaming establishment 108. Gaming server 102 may include different computing devices located together or separated over a geographic region in other gaming system embodiments. For example, gaming server 102 may include a first server or computing device that implements a primary game, and a second server or computing device that implements a secondary game, such as a random reward game.

In some examples, gaming device 106 may include a portable computing device, such as a smartphone, a laptop, a tablet, a personal digital assistant (PDA), a portable gaming console, or other portable device suitable for use as described herein. In other examples, gaming device 106 may include, without limitation, a personal computer, a gaming console, a workstation, or other non-portable computing device. As shown in FIG. 2, gaming devices 106 are generally associated with (e.g., owned, operated, and/or managed by) one or more players 110, rather than the gaming establishment.

Gaming server 102 is coupled to gaming machines 104 through a first network 112. In several embodiments, first network 112 is a private network, substantially controlled by an operator of gaming establishment 108. In other embodiments, first network 112 can include a partially or wholly public network. Further, in the exemplary embodiment, gaming server 102 is coupled to gaming device 106 through a second network 114. In the exemplary embodiment, second network 114 includes a public network, accessible to various different types of devices, generally outside the control of the operator of gaming establishment 108. In another embodiment, second network 114 may include a private network, such as a gaming network, to access, for example, one or more games. First and second networks 112 and 114 may include, without limitation, the Internet, a local area network (LAN), a wide area network (WAN), a wireless LAN (WLAN), a mesh network, a virtual private network (VPN), a cellular network, and/or any other network that enables gaming system 100 to function as described herein.

In the exemplary embodiment, gaming sever 102 manages one or more aspects, games, jackpots, player accounts, and/or other operations of gaming establishment 108. For example, gaming server 102 is provided to manage one or more random rewards. As used herein, the term "random reward" refers to a secondary game hosted by a gaming entity, at gaming server 102, which pays an award once at least one predetermined condition is satisfied. A random reward may include, for example, a mystery jackpot, which is guaranteed to pay when one of the plurality of gaming machines 104 causes a running total associated with the mystery jackpot to exceed a trigger amount or threshold, or to otherwise satisfy a trigger or win condition. Trigger or win conditions are generally tracked by gaming server 102 and may include, without limitation, a number of codes received, time intervals, particular gaming machines, etc.

In the exemplary embodiment, a random reward may also include, but is not limited to only including, a random bonus, or any other award that can be based on any number of factors, including random coin-in determination, a predetermined time, a random gaming machine, a random casino, a random player tracking number, and/or any combination of such factors. In one embodiment, the random reward payment may include bonus feature rounds, win multipliers, or free-spins for the player who triggers the random reward and/or all players associated with the random reward, including a "circle of friends". As used herein, the term "circle of friends" refers to a smaller group of individuals that have a relationship, wherein all individuals requested to participate in the circle. In such a relationship, generally one player oversees the circle and sends out invitations to form the circle. Such a relationship may be based on any number of factors including a preferred gaming location of the players, the age of the players, the geographic location of the players, and/or any combination of these factors and others. As such, participants in the circle of friends may be at multiple locations, may not participate through traditional casinos, and/or may use multiple devices, including those that participate remotely through the Internet, for example. In another example, participants in the circle of friends could participate through a social media account, such as through Facebook®, for example. It should be noted, that as used herein, the right to participate in the circle of friends is provided to a person and not to a specific device. In at least one embodiment, the random reward payout may be multiplied by the player's bet when the player triggered the random reward. Additionally, or alternatively, the random reward payout may be determined by the rewards account of the player triggering the random reward, and/or the rewards accounts of some or all players associated with the random reward. The random reward payout may be determined and/or modified, by gaming server 102, when the random reward is established, when the random reward is triggered, and/or at some point therebetween.

Gaming server 102 is provided to detect inputs related to the random rewards, and ultimately, award the random reward when the win condition is satisfied. In the exemplary embodiment, the random rewards may be secondary games or chances to win a jackpot at gaming machines 104 and/or primary games at gaming machines 104. Gaming server 102 may perform a plurality of functions including, for example, game outcome generation, and/or accounting functions. However, in alternative embodiments, gaming system 100 may include a plurality of servers that separately perform these functions and/or any suitable function for use in a network-based gaming system. In some embodiments, gaming server 102 controls bonus applications or bonus systems that award bonus opportunities (e.g., base play bonuses and/or free plays) on gaming machine 104. Moreover, gaming server 102 may include a set of rules for awarding jackpots in excess of those established by winning pay tables (not shown) of each gaming machine 104. Some bonus awards may be awarded randomly, while other bonus awards may be made to groups of gaming machines 104 operating in a progressive jackpot mode.

Additionally, gaming server 102 manages a plurality of player tracking accounts. Each of the player tracking accounts is associated with a player 110 to track various aspects of the player's interactions within gaming system 100. For example, gaming server 102 keeps track of player information including, without limitation, player contact information, time spent playing particular games, favorite types of gaming machines 104, player bet data, preferred hours of gaming, preferred applications, preferred table games, and/or any other information about the player or the player's interaction with gaming system 100. Operators of gaming establishment 108 may utilize such information to provide specials, incentives, and/or rewards to player 110 based on one or more aspects of the information. In various embodiments, players 110 receive and retain player's cards, which permit gaming machines 104 and/or other games to associate player 110 with a particular player tracking account. For example, a player's card may include an account number associated with the player tracking account, which is electronically readable by a card reader input interface 24 at a gaming machine 104.

In the exemplary embodiment, gaming machine 104 further provides one or more games to player 110. As used herein, the term "game" refers to applications which provide the opportunity, within the application, to wager and/or win real money. Games may include, without limitation, poker games, slot or reel-based games, racing games, sports games, or other games which may be played at gaming machine 104. When a game is played at gaming machine 104, gaming activity is accumulated by player 110 and is associated with the player tracking account. Gaming activity may be measured, for example, based on time played, level, object, and/or points achieved, amount wagered, games played, and/or other metrics associated with the game. The gaming activity from one or more games may be utilized in various manners to provide codes which may be redeemed by player 110 for chances to win the random reward.

Moreover, in the exemplary embodiment, at least one communication device 116 is associated with one or more players 110 for communicating with gaming server 102 and/or gaming establishment 108, as described more fully herein. Communication device 116 includes, but is not limited to only including, a cellular phone ("cell phone") and/or a tablet computing device, or tablet, that enables text messages to be received and transmitted by player 110. Accordingly, in one embodiment, communication device 116 may also be a gaming device 106. Alternatively, communication device 116 may include any suitable device that enables text messages to be transmitted and received by player 110.

As used herein, the term "text message" refers to a message transmitted or received via a short message service (SMS), an enhanced messaging service (EMS), and/or a multimedia messaging service (MMS). Alternatively, text messages used herein may include one or more instant messages (IMs), emails, posts or entries of data at a website, and/or any other text-based message that enables gaming system 100 to function as described herein.

In one embodiment, communication device 116 is communicatively coupled to a communication server 118. Communication server 118 may be a server or another computing device associated with a cellular service provider for use in forwarding text messages (or data representative of the text messages) between communication device 116 and gaming server 102. It should be recognized that communication device 116 may be communicatively coupled to communication server 118 via additional components of a cellular and/or network infrastructure (not shown), such as one or more cellular towers and/or other servers, as is known in the art.

As used herein, gaming server 102 issues at least one code that represents a chance or an entry to win the random reward. For example, in at least some embodiments, the code includes an alphanumeric sequence that may be transmitted, or "texted," to gaming server 102 by player 110 using communication device 116 and/or gaming machine 104. The code may be transmitted to communication device 116 and/or to gaming machine 104 electronically such that the code is displayed to player 110 on communication device 116 and/or gaming machine 104. Alternatively, the code may be printed on a ticket as an alphanumeric sequence and/or as a barcode, for example.

In one embodiment, the code is received and/or entered into an application installed on communication device 116. The application is associated with the game and/or gaming establishment 108, and the application facilitates transmitting the codes to gaming server 102 and/or receiving the codes from gaming server 102 for entry to win the random reward. In a further embodiment, the application enables communication device 116 to receive codes from gaming machine 104 using a suitable wireless technology, such as near field communication, and/or by scanning the codes by communication device 116, for example.

Figure 3:
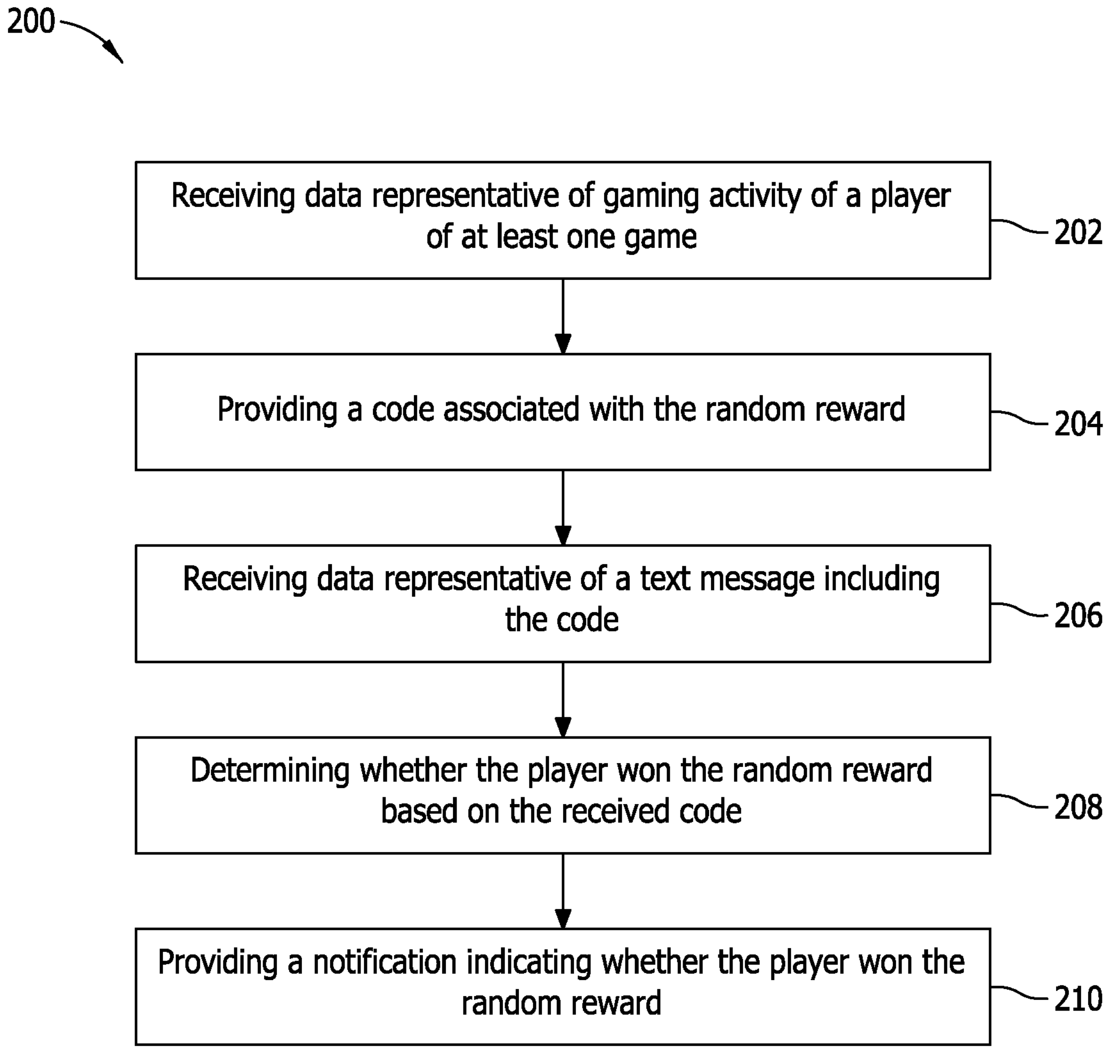
FIG. 3 is a block diagram of the exemplary methods for use in providing a random reward associated with at least one game.

FIG. 3 illustrates an exemplary method 200 for use in providing a random reward associated with at least one game. While method 200 is described herein with reference to gaming system 100, it should be appreciated that method 200 is not limited to gaming system 100 and that method 200 may be used in other gaming system embodiments. Moreover, gaming system 100 should not be understood to be limited to method 200.

In the exemplary embodiment, gaming server 102 receives 202 data representative of gaming activity by a player 110 of a game presented on a gaming machine 104. For example, gaming machine 104 transmits data representative of the gaming activity of player 110 as one or more games are played on gaming machine 104.

Gaming server 102 provides 204 a code associated with a random reward. More specifically, the code is representative of an entry to win the random reward. It should be recognized that, while the embodiment herein is described with reference to a single code, multiple codes may be provided 204 by gaming server 102 in a similar manner as described herein. In the exemplary embodiment, each code includes a phone number or another identifier that specifies the destination to which the code should be transmitted for entry to win the random reward.

In one embodiment, the code may be transmitted to gaming machine 104 and/or to communication device 116 based on the gaming activity of player 110 and/or if at least one predetermined condition is met. The predetermined condition may be met if, for example, an amount wagered by the player exceeds a predetermined threshold, the player plays at least one game within a predetermined time window, an amount of time the player has played at least one game exceeds a predetermined threshold, and/or the player plays at least one game with a predetermined number of other players satisfying a predetermined relationship. Alternatively, the predetermined condition may include any other condition that enables method 200 to function as described herein. The predetermined relationship may include, for example, an association of players within a circle of friends (described above), an association of players based on player tracking accounts, an association of players in which each player enters into a joint chance to win the random reward, an association of players within one or more social media sites (e.g., where the players are identified as friends or associates of each other), and/or any other relationship that enables method 200 to function as described herein. In another embodiment, the predetermined condition may include viewing an advertisement to enable a free code, or a code available at a reduced price, to be provided to player 110.

In one embodiment, gaming server 102 causes the code to expire, or invalidates the code, after a predetermined time elapses. In such an embodiment, gaming server 102 will disregard an expired code if the expired code is received. In another embodiment, player 110 may purchase additional codes from gaming server 102. In such an embodiment, gaming server 102 receives a payment credit from player 110 and provides one or more additional codes to player 110 based on the payment credit.

In yet another embodiment, codes may be stored by player 110 for later use. For example, player 110 may receive one or more codes for entry toward a first random reward. If player 110 does not use the codes to enter to win the first random reward, player 110 may use the codes to enter to win a second (later) random reward. In such an embodiment, the codes may be stored within communication device 116. Alternatively, the codes may be stored within gaming machine 104 and/or within gaming server 102 and may be linked to the player tracking account, for example.

In the exemplary embodiment, player 110 enters to win the random reward by transmitting one or more codes to gaming server 102. More specifically, player 110 texts (i.e., transmits via one or more text messages) the code to gaming server 102. Data representative of the text message (including the code) is received 206 by gaming server 102.

In the exemplary embodiment, the text message is initiated by player 110 after the code is displayed to player 110 on gaming machine 104 and/or communication device 116. For example, if the code is displayed to player 110 on gaming machine 104, an option may be presented to player 110 to transmit the code via a text message from gaming machine 104 to gaming server 102. In one embodiment, a cost of the text message may be deducted from an account of player 110 if gaming machine 104 transmits the text message. Player 110 may also initiate a text message of the code to gaming server 102 using communication device 116 if the code is displayed to player 110 on communication device 116 and/or on gaming machine 104.

Accordingly, gaming server 102 may receive 206 data representative of the text message, including the code, from communication device 116 and/or from gaming machine 104 operated by player 110. It should be recognized that, if a plurality of codes were provided to player 110, more than one code may be transmitted to, and received 206 by, gaming server 102. Moreover, a single text message to gaming server 102 may include a plurality of codes.

In the exemplary embodiment, gaming server 102 determines 208 whether player 110 won the random reward based on each received code, for example, by determining whether at least one win condition is satisfied. The win condition may include receiving the code within a predetermined time window or after a predetermined time elapses from issuing the code, for example. Other win conditions may include, but are not limited to only including, determining that an amount wagered by player 110 during one or more games exceeded a predetermined threshold, determining that a predetermined number of other codes were received during a predetermined time window, determining that the code received matches a code that was predetermined to be the winning code for the random reward, assigning a numerical chance to win the random reward to each code and using a random number to determine whether the code is a winning code, determining that a predetermined number of other players satisfying a predetermined relationship (described above) play one or more games with player 110, and/or any other win condition that enables method 200 to function as described herein. In one example, a time window may be defined in which the random reward may be won (e.g., one hour after initiating the random reward). Moreover, a winning code may be determined such that, for example, the 10th code received during the time window is the code that wins the random reward.

In one embodiment, the odds of winning the random reward are adjusted for each code based on one or more factors. For example, the odds for a code to win the random reward (e.g., the numerical chance for the code to win the random reward) may be weighted based on an amount wagered by player 110 during one or more games, an amount of time that player 110 played one or more games, a number of codes received from player 110, a number of codes received from other players satisfying a predetermined relationship (such as the predetermined relationship described above), a player status (e.g., "silver status," "gold status," "elite status," etc.), and/or based on any other factor that enables method 200 to function as described herein.

In the exemplary embodiment, gaming server 102 provides 210 a notification indicating whether player 110 won the random reward based on the code received by server 102. For example, if gaming server 102 determines that the code received from player 110 met the predetermined win condition, gaming server 102 transmits a notification to player 110 (via gaming machine 104 and/or communication device 116) indicating that player 110 won the random reward. The payout for the random reward is credited to an account of player 110 or is otherwise provided to player 110.

In one embodiment, one or more advertisements are provided with the notification of whether player 110 won the random reward. For example, the advertisement and the notification may be transmitted to gaming machine 104 and/or to communication device 116 such that additional revenue streams may be generated by gaming establishment 108. The advertisements may include, for example, opportunities to buy additional codes, discounts for products and/or services within, or associated with, gaming establishment 108, and/or any other advertisements that enables method 200 to function as described herein.

The systems and methods are not limited to the specific embodiments described herein but, rather, operations of the methods and/or components of the system may be utilized independently and separately from other operations and/or components described herein. Further, the described operations and/or components may also be defined in, or used in combination with, other systems and/or methods and are not limited to practice with only the systems and methods as described herein.

By way of example and not limitation, computer readable media includes, for example, one or more non-transitory computer-readable storage devices and/or computer-readable storage media. Computer-readable storage media include volatile and nonvolatile, removable and non-removable media implemented in any method or technology for storage of information such as computer readable instructions, data structures, program modules, or other data in a device.

Although the present disclosure is described in connection with an exemplary gaming system, embodiments of the invention are operational with numerous other general purpose or special purpose gaming systems or configurations. The gaming system is not intended to suggest any limitation as to the scope of use or functionality of any aspect described herein. Moreover, the gaming system environment should not be interpreted as having any dependency or requirement relating to any one or combination of components illustrated in the exemplary operating environment.

Embodiments of the invention may be described in the general context of computer-executable instructions, such as program components or modules, executed by one or more computers or other devices. Aspects described herein may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method for use in providing a random benefit associated with at least one electronic game, said method comprising:

receiving, by a server from a game play device, electronic inputs corresponding to game play activity by a player, wherein the game play activity is associated with a player tracking account associated with the player, and wherein the player tracking account is stored by the server within a memory;

transmitting, by the server to a portable computing device of the player, a code provided for entry towards a random benefit;

storing, by the server within the memory, the code linked to the player tracking account;

after storing the code within the memory linked to the player tracking account, receiving, by the server from the portable computing device, the code linked to the player tracking account during game play activity;

in response to receiving the code from the portable computing device, determining, by the server, that the player is eligible to receive the random benefit by (i) verifying that the received code matches the transmitted code, and (ii) determining that a trigger condition associated with the game play activity and the random benefit is satisfied; and transmitting, by the server to the portable computing device, a notification regarding the random benefit in response to determining that the player is eligible to receive the random benefit.

2. The computer-implemented method of claim 1, further comprising determining that the trigger condition for the random benefit is satisfied, wherein the trigger condition includes one of an amount wagered during the game play activity and an amount of time spent by the player on the game play activity.

3. The computer-implemented method of claim 1, further comprising:

receiving, by the server, an input credit from the player; and transmitting, by the server to the portable computing device, at least one additional code based on the input credit, wherein the input credit is deducted from a credit amount associated with the player tracking account.

4. The computer-implemented method of claim 3, further comprising storing, by the server, the at least one additional code within the memory linked to the player tracking account.

5. The computer-implemented method of claim 1, further comprising transmitting, by the server, an award credit to the player as the random benefit, wherein the award credit is added to a credit amount associated with the player tracking account.

6. The computer-implemented method of claim 1, wherein the portable computing device is one of a cellular phone and a tablet computing device of the player.

7. The computer-implemented method of claim 6, wherein the code is transmitted to the portable computing device as a text message via a messaging server, and wherein the server stores the code within the memory for later retrieval.

8. The computer-implemented method of claim 7, further comprising transmitting, by the server to the portable computing device, an input credit for the text message, wherein the input credit is deducted from a credit amount associated with the player tracking account.

9. A gaming server for use in providing a random benefit associated with at least one electronic game, said gaming server comprising:

a computer-readable storage medium comprising computer-executable instructions; and a processor coupled to said computer-readable storage medium for executing the computer-executable instructions, wherein, when said processor executes the computer-executable instructions, said processor is programmed to:

receive, from a game play device, electronic inputs corresponding to game play activity by a player, wherein the game play activity is associated with a player tracking account associated with the player, and wherein the player tracking account is stored by the gaming server within a memory;

transmit, to a portable computing device of the player, a code provided for entry towards a random benefit;

store, within the memory, the code linked to the player tracking account;

after storing the code within the memory linked to the player tracking account, receive, from the portable computing device, the code linked to the player tracking account during game play activity;

in response to receiving the code from the portable computing device, determine that the player is eligible to receive the random benefit by (i) verifying that the received code matches the transmitted code, and (ii) determining that a trigger condition associated with the game play activity and the random benefit is satisfied; and transmit, to the portable computing device, a notification regarding the random benefit in response to determining that the player is eligible to receive the random benefit.

10. The gaming server of claim 9, wherein the trigger condition for the random benefit includes one of an amount wagered during the game play activity and an amount of time spent by the player on the game play activity.

11. The gaming server of claim 9, wherein said processor is further configured to:

receive an input credit from the player; and transmit, to the portable computing device, at least one additional code based on the input credit, wherein the input credit is deducted from a credit amount associated with the player tracking account.

12. The gaming server of claim 11, wherein said processor is further configured to store the at least one additional code within the memory linked to the player tracking account.

13. The gaming server of claim 9, wherein said processor is further configured to transmit an award credit to the player as the random benefit, wherein the award credit is added to a credit amount associated with the player tracking account.

14. The gaming server of claim 9, wherein the portable computing device is one of a cellular phone and a tablet computing device of the player.

15. The gaming server of claim 14, wherein code is transmitted to the portable computing device as a text message via a messaging server, and wherein the server stores the code within the memory for later retrieval.

16. The gaming server of claim 15, wherein said processor is further configured to transmit, to the portable computing device, an input credit for the text message, wherein the input credit is deducted from a credit amount associated with the player tracking account.

17. A gaming system for use in providing a random benefit associated with at least one electronic game, said gaming system comprising:

a gaming machine configured to present the at least one electronic game to a player; and a gaming server coupled to said gaming machine, wherein said gaming server is programmed to:

receive, from a game play device, electronic inputs corresponding to game play activity by a player, wherein the game play activity is associated with a player tracking account associated with the player, and wherein the player tracking account is stored by the server within a memory;

transmit, to a portable computing device of the player, a code provided for entry towards a random benefit;

store, within the memory, the code linked to the player tracking account;

after storing the code within the memory linked to the player tracking account, receive, from the portable computing device, the code linked to the player tracking account during game play activity;

in response to receiving the code from the portable computing device, determine that the player is eligible to receive the random benefit by (i) verifying that the received code matches the transmitted code, and (ii) determining that a trigger condition associated with the game play activity and the random benefit is satisfied; and transmit, to the portable computing device, a notification regarding the random benefit in response to determining that the player is eligible to receive the random benefit.

18. The gaming system of claim 17, wherein the trigger condition for the random benefit includes one of an amount wagered during the game play activity and an amount of time spent by the player on the game play activity.

19. The gaming system of claim 17, wherein the gaming server is further programmed to:

receive an input credit from the player; and transmit, to the portable computing device, at least one additional code based on the input credit, wherein the input credit is deducted from a credit amount associated with the player tracking account.

20. The gaming system of claim 19, wherein the gaming server is further programmed to store the at least one additional code within the memory linked to the player tracking account.

* * * * *